UNITED STATES PATENT OFFICE.

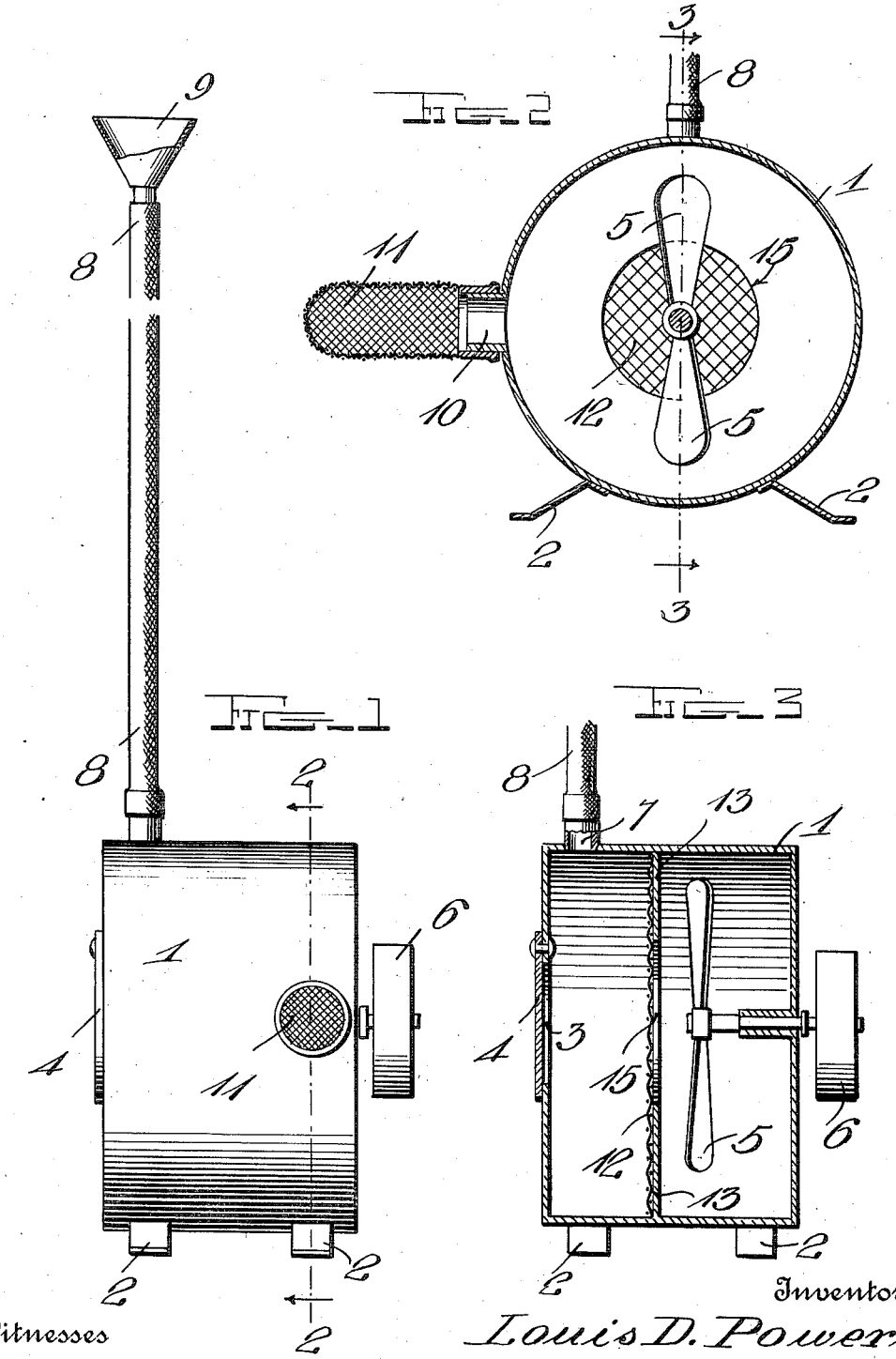

LOUIS D. POWERS, OF ANADARKO, OKLAHOMA.

INSECT-DESTROYER.

1,006,271. Specification of Letters Patent. Patented Oct. 17, 1911.

Application filed December 23, 1909. Serial No. 534,638.

*To all whom it may concern:*

Be it known that I, LOUIS D. POWERS, a citizen of the United States, residing at Anadarko, in the county of Caddo and State of Oklahoma, have invented certain new and useful Improvements in Insect-Destroyers; and I do declare the following to be a full, clear, and exact description of the invention, such as will enable others skilled in the art to which it appertains to make and use the same.

This invention relates to improvements in insect destroyers.

The object of the invention is to provide a device of this character having means whereby flies and other insects may be drawn or sucked therein and discharged therefrom into a suitable receptacle provided to receive the same and in which they may be destroyed.

With the foregoing and other objects in view, the invention consists of certain novel features of construction, combination and arrangement of parts as will be more fully described and particularly pointed out in the appended claim.

In the accompanying drawings, Figure 1 is a side view of the destroyer constructed in accordance with the invention; Fig. 2 is a vertical section on line 2—2 of Fig. 1; Fig. 3 is a central vertical longitudinal section taken on line 3—3 of Fig. 2.

In the embodiment of the invention, I provide a casing 1 which may be constructed of any suitable material and which is preferably of cylindrical form and is provided with feet 2 or a suitable base by means of which it may be secured to a stand or other support, not shown. The casing 1 is closed at its opposite ends and in the front end thereof is formed a clean-out opening 3, which is normally closed by a pivoted cover plate 4.

Revolubly mounted in a suitable bearing aperture in the rear end plate of the casing is a fan shaft on the inner end of which is arranged a fan 5, which may be of any suitable construction. The fan shaft projects through the rear end of the casing and has mounted thereon a pulley 6 which is adapted to be connected by a belt to any suitable motor, by means of which motion is imparted to the fan. In one side of the casing adjacent to its forward end is formed a suction opening 7 around which is formed an upwardly radially projecting tube or nipple with which is adapted to be connected the inner end of a flexible suction tube 8 on the outer end of which is secured a funnel 9 to provide an enlarged opening through which insects may be sucked into the tube and casing by the action of the fan.

In the rear portion of the casing back of the fan is arranged a discharge or exhaust opening 10, around which is arranged a radially outwardly projecting tube or nipple to which is adapted to be detachably connected a receptacle 11 which is preferably formed of wire netting and into which the flies or other insects which have been drawn into the casing are discharged by the draft passing through the inclosed opening 10.

In the casing 1, substantially midway between the ends of the same, is arranged a partition 12 formed of wire netting, the meshes of which are coarse enough or of sufficient size to permit the passage of flies and other insects but are not large enough to permit the passage of obstructions of any kind which would interfere with the operation of the fan.

In order to increase the suction of the fan through the front portion of the casing and the suction tube 8, I preferably provide a solid partition 13, which is arranged in the casing immediately in front of the wire netting partition and in the center of said solid partition is formed a suction opening 15. The reduced opening formed by the hole 15 in the partition 13 serves to increase the draft or suction from the fan, thus facilitating the operation of the device.

When using the device, the same is preferably placed upon a wheeled stand or other support whereby it may be readily pushed along. When the fan has been started and a suction created through the casing and suction tube and the funnel on the end of the same brought into proximity with a fly or insect, the same will be drawn through the tube into the casing and discharged therefrom into the receptacle 11 which, when the same has been filled, may be immersed in water or the insects otherwise destroyed.

By means of a fly catcher constructed as herein shown and described, it will be readily seen that when the funnel on the end of the suction tube is brought into proximity with a swarm of flies or other insects that they will be sucked into the casing in great numbers and thus destroyed.

From the foregoing description taken in connection with the accompanying drawings, the construction and operation of the invention will be readily understood without requiring a more extended explanation.

Having thus described my invention, what I claim is:—

A fly catcher comprising a casing with a clean-out opening in its rear wall, a fan shaft journaled in the front wall of the casing having a pulley on its outer end and a fan on its inner end arranged within the casing, a discharge opening arranged at right angles to the fan having an elongated reticulated receptacle detachably connected thereto and extending horizontally therefrom, a suction opening in one side of the casing having a nipple connected therewith, a suction tube having one end detachably connected to the nipple, the other end of the suction tube having a detachable funnel connected thereto, a reticulated partition connected approximately to the central portion of the casing, a solid partition contacting with the reticulated material and having a central suction opening therein whereby to increase the draft from the fan so as to facilitate the operation of the device.

In testimony whereof I have hereunto set my hand in presence of two subscribing witnesses.

LOUIS D. POWERS.

Witnesses:
ISAAC M. CLAMSON,
JAMES R. DEAN.